US011763318B2

(12) United States Patent
Friio

(10) Patent No.: US 11,763,318 B2
(45) Date of Patent: Sep. 19, 2023

(54) SYSTEMS AND METHODS RELATING TO PROVIDING CHAT SERVICES TO CUSTOMERS

(71) Applicant: GENESYS CLOUD SERVICES, INC., Daly City, CA (US)

(72) Inventor: Andrea Friio, Daly City, CA (US)

(*) Notice: Subject to any disclaimer, the term of this patent is extended or adjusted under 35 U.S.C. 154(b) by 32 days.

(21) Appl. No.: 17/392,866

(22) Filed: Aug. 3, 2021

(65) Prior Publication Data

US 2023/0040119 A1  Feb. 9, 2023

(51) Int. Cl.
| G06F 3/04817 | (2022.01) |
| H04L 51/02 | (2022.01) |
| H04L 51/04 | (2022.01) |
| G06Q 30/016 | (2023.01) |

(52) U.S. Cl.
CPC ....... G06Q 30/016 (2013.01); G06F 3/04817 (2013.01); H04L 51/02 (2013.01); H04L 51/04 (2013.01)

(58) Field of Classification Search
CPC ... G06Q 30/016; G06F 3/04817; H04L 51/02; H04L 51/04
See application file for complete search history.

(56) References Cited

U.S. PATENT DOCUMENTS

| 9,762,733 B1* | 9/2017 | Ramanujaiaha | H04M 3/42068 |
| 11,134,149 B1* | 9/2021 | Daniel | H04M 7/0012 |
| 2003/0112948 A1* | 6/2003 | Brown | H04M 3/4228 |
| | | | 379/207.04 |
| 2014/0314225 A1* | 10/2014 | Riahi | H04L 51/02 |
| | | | 379/265.09 |
| 2016/0099892 A1* | 4/2016 | Palakovich | H04L 51/04 |
| | | | 709/206 |
| 2017/0076194 A1* | 3/2017 | Versace | G06N 3/02 |
| 2018/0239837 A1* | 8/2018 | Wang | G06F 16/90335 |
| 2020/0082214 A1* | 3/2020 | Salammagari | G06N 3/006 |

(Continued)

FOREIGN PATENT DOCUMENTS

WO  20210050879 A1  3/2021

OTHER PUBLICATIONS

Kryukov, Denis, "Overview of Bots in Social Media and Messengers" (2019), pp. 8, 16 (Year: 2019).*

(Continued)

*Primary Examiner* — Jennifer N Welch
*Assistant Examiner* — Reji Kartholy

(57) ABSTRACT

A method for implementing chats that includes: providing a chat feature and chat interface on a webpage; providing two types of the chat resources for generating the text inputs of the chats, an automated chat resource type and a human chat resource type; providing a routing function that selectively routes incoming chats between the two types of the chat resources; providing a first selectable portion on the chat interface that, when selected by a customer, indicates a customer chat preference as to whether the customer prefers to chat with chat resources of the automated chat resource type or human chat resource type; receiving input from the customer device indicating that the customer selected the first selectable portion; determining from the received input the customer chat preference; and routing in accordance with the determined preference.

16 Claims, 6 Drawing Sheets

(56) References Cited

U.S. PATENT DOCUMENTS

2020/0137230 A1* 4/2020 Spohrer .............. H04M 7/0027
2020/0225832 A1* 7/2020 Niki .................... G06F 3/04817
2022/0103684 A1* 3/2022 Chavez ................ H04M 3/493

OTHER PUBLICATIONS

International Search Report and Written Opinion regarding co-pending PCT application having application No. PCT/US2022/039276 dated Nov. 15, 2022.

* cited by examiner

SYSTEMS AND METHODS RELATING TO PROVIDING CHAT SERVICES TO CUSTOMERS

BACKGROUND

The present invention generally relates to telecommunications systems in the field of customer relations management including customer assistance via internet-based service options. More particularly, but not by way of limitation, the present invention pertains to systems and methods for implementing chat services with customers.

BRIEF DESCRIPTION OF THE INVENTION

The present invention includes a computer-implemented method related to implementing chats between customers and chat resources associated with an organizational entity. Each of the chats includes an exchange of text inputs between a customer of the customers using a customer device and a chat resource of the chat resources over a network. The method may include: providing a chat feature on a webpage associated with the organizational entity, wherein the chat feature is accessible by the customer upon the customer accessing the webpage via the customer device and configured to enable the customer to instigate the chat with the chat resource; providing, as part of the chat feature, a chat interface for display on the customer device as part of the webpage; providing, as part of the chat feature, two types of the chat resources for generating the text inputs of the chats, wherein the two types of the chat resources are differentiated by whether the text inputs are generated by an automated source, in which case the type of chat resources is designated as an automated chat resource type, or generated by a human source, in which case the type of chat resources is designated as a human chat resource type; providing, as part of the chat feature, a routing function that selectively routes incoming chats between the two types of the chat resources so that, in operation of the chat feature, at least some of the incoming chats are routed to the chat resources of the automated chat resource type and at least some of the incoming chats are routed to the chat resources of the human chat resource type; providing, as part of the chat feature, a first selectable portion that displays on the chat interface that, when selected by the customer, indicates a customer chat preference as to whether the customer prefers to chat with the chat resources of the automated chat resource type or the chat resources of the human chat resource type; and using the chat feature in an implementation routine to implement a first chat of the chats instigated by a first customer of the customers. The implementation routine may include transmitting a signal configured to generate the chat interface on the customer device of the first customer, wherein the chat interface generated on the customer device of the first customer includes the first selectable portion; receiving input from the customer device of the first customer indicating that the first customer selected the first selectable portion; determining, from the received input, the customer chat preference of the first customer; and routing the first chat of the first customer to the chat resources of the human chat resource type or the chat resources of the automated chat resource type in accordance with the determined customer chat preference of the first customer.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
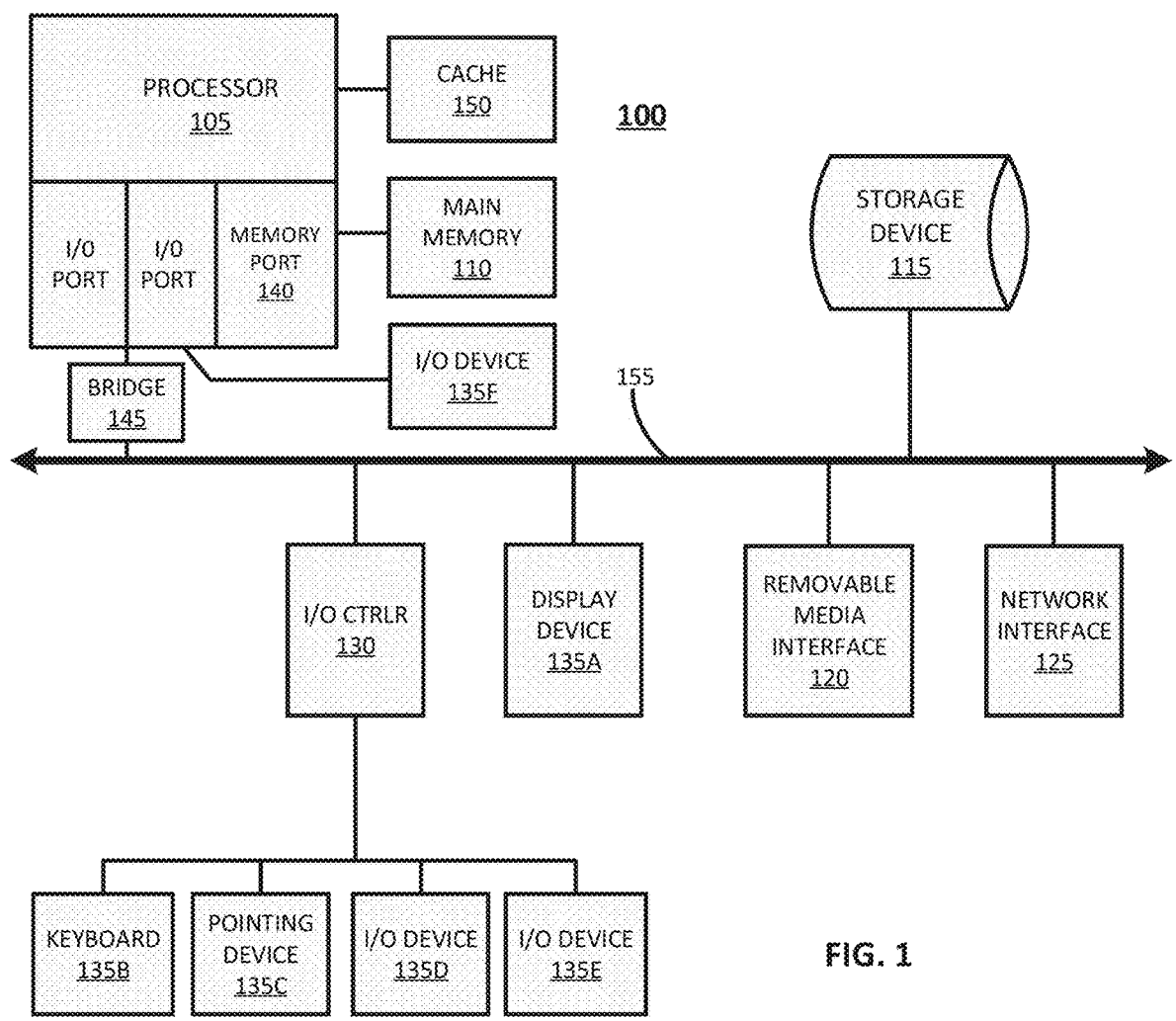
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 includes a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any conventional communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization are also contemplated.

Contact Center

Figure 2:
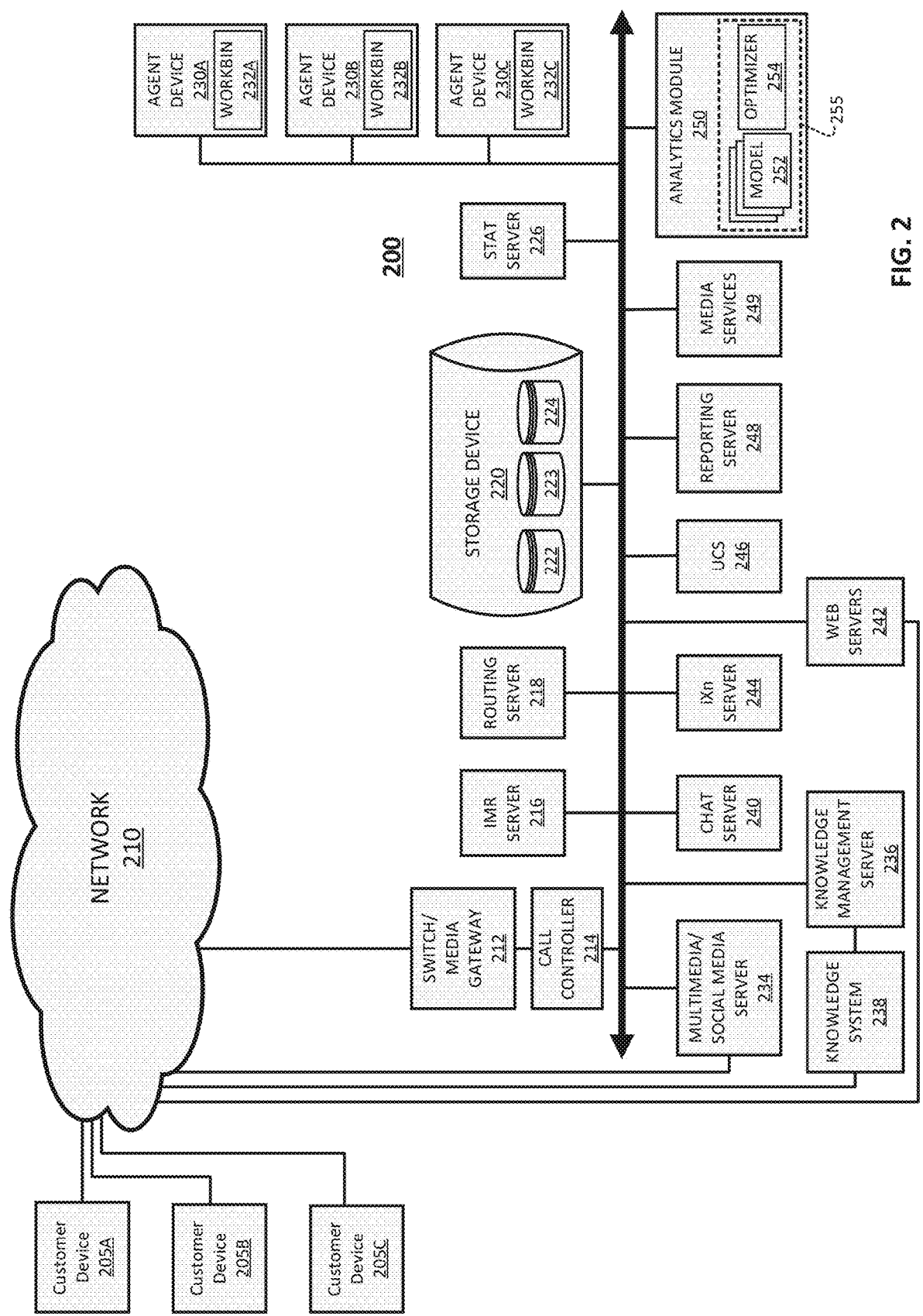
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services)

that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Chat Systems

Turning to FIGS. 3 through 6, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3-6. While these examples are provided with respect to chat systems implemented on the contact center-side, such chat systems may be used on the customer-side of an interaction. Thus, it should be understood that the exemplary chat systems of FIGS. 3-6 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Figure 3:
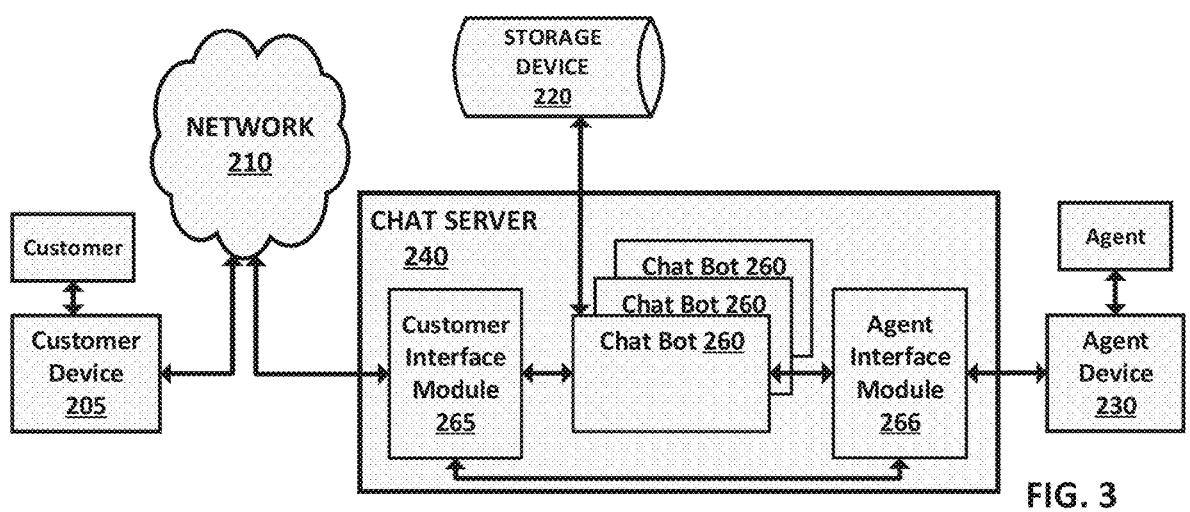
FIG. 3 is schematic block diagram showing further details of a chat server operating as part of the chat system according to embodiments of the present invention.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by an enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generating user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Figure 4:
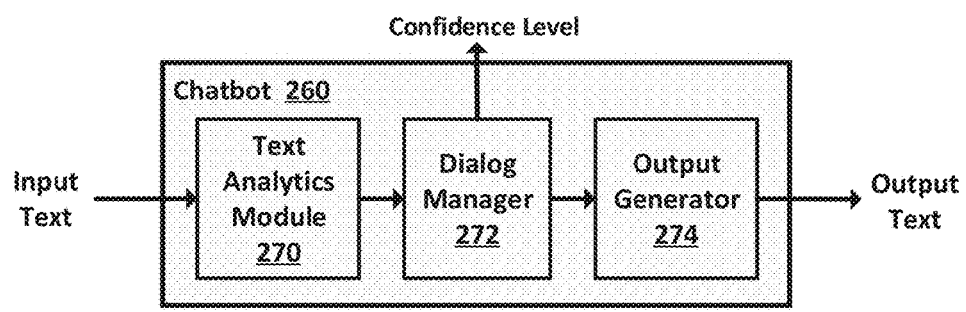
FIG. 4 is a schematic block diagram of a chat module according to embodiments of the present invention.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Figure 5:
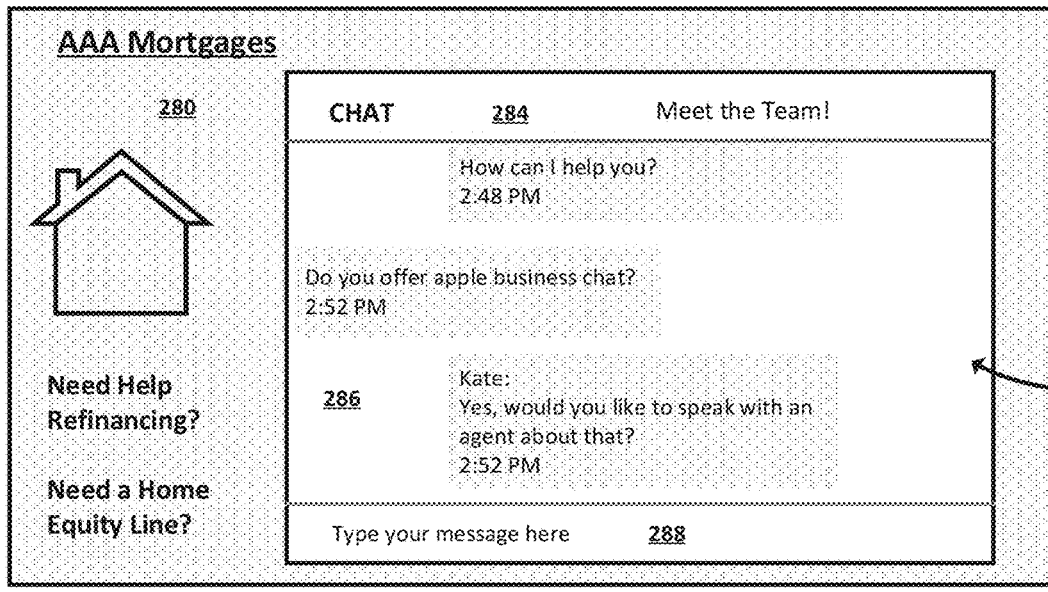
FIG. 5 is an exemplary customer chat interface according to embodiments of the present invention.

Reference will now be made to FIG. 5, in which a webpage 280 having an exemplary implementation of a chat feature 282 is presented. The webpage 280, for example, may be associated with an enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a past text inputs display area (or "conversation portion") 286, which is the area dedicated to the chronological display of received and sent text messages. The customer chat interface 284 further includes a text input area (or "input portion") 288, which is the designated area in which the customer inputs the text of their next message. In example embodiments, a chat may be initiated by the customer entering information into the input portion 288. In other embodiments, a chat feature may include a chat initiation interface, such as the one shown in FIG. 6, that requests certain information from the customer before the chat begins. As will be appreciated, other configurations are also possible.

Figure 6:
FIG. 6 is an alternative customer chat interface according to embodiments of the present invention.

As shown in FIG. 6, an alternative customer chat interface 290 is shown. This interface 290 may be used as part of a chat feature 282 to allow a customer to initiate a chat. As shown, similar to the above, the customer chat interface 290 may be contained within a designated area or window, with that window covering a designated portion of a webpage 280. The customer chat interface 290 also may include several input areas where the customer is prompted for particular information, which may be required before initiation of the chat is allowed. The customer chat interface 290 may further include an activation button 292 that, when activated or clicked by the customer, affirmatively begins the chat. Once the chat begins, the chat feature 282 may bring in interface elements (like those shown in FIG. 5) that allow for text inputs and provide a record of the conversation. As will be appreciated, elements of the customer chat interfaces shown in FIGS. 5 and 6 also may be combined and/or used simultaneously in the same chat interface.

Figure 7:
FIG. 7 is an alternative customer chat interface according to embodiments of the present invention.
Figure 8:
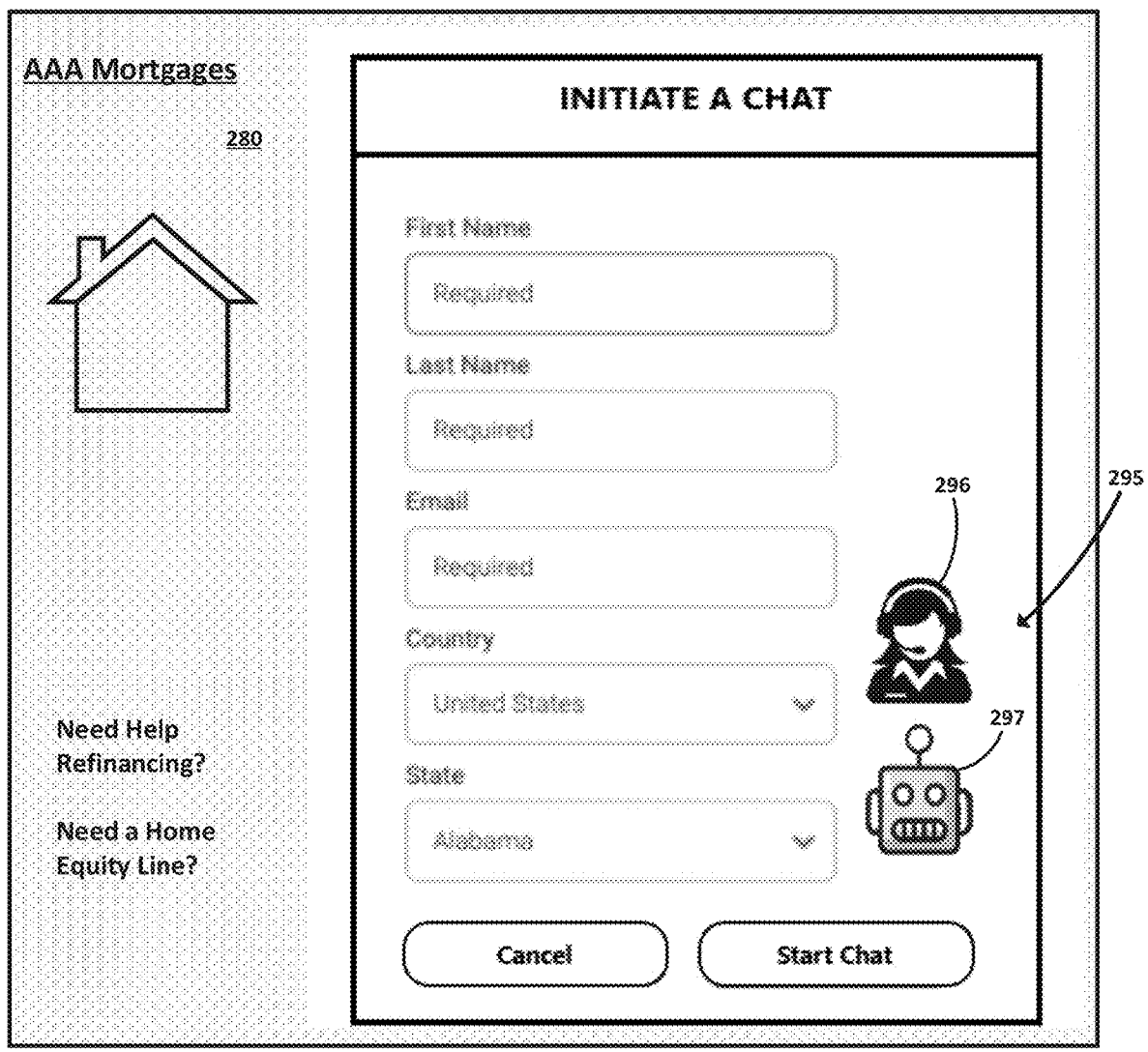
FIG. 8 is an alternative customer chat interface according to embodiments of the present invention.
Figure 9:
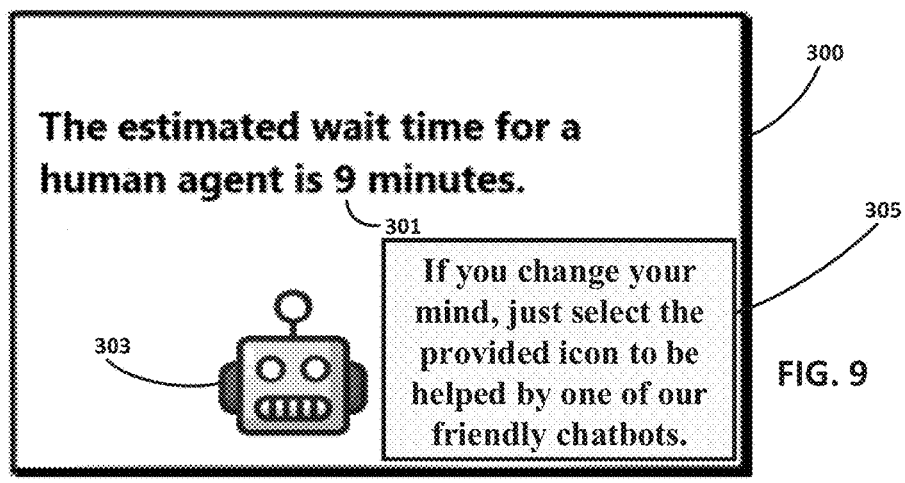
FIG. 9 is an alternative customer chat interface according to embodiments of the present invention.

With reference now to FIGS. 7 through 9, aspects of the present invention will be discussed that allow customer to efficiently provide a chat preference, which can be used to allow customers to simply bypass a chatbot (i.e., an automated chat resource) in order to chat with a live human agent. As will be appreciated, it has become almost automatic that companies offering chat services over the web initially have customers communicate with an automated chat resource, e.g. a chatbot, that is powered by AI. This experience is generally frustrating due to the many limitations of the AI powered chatbots. Quite often—in fact, substantially always—consumers engaged with such chatbots looks for ways to be transferred as soon as possible to a human agent, and frustration levels can soar in cases where time is pressing or in cases of an emergency. Yet, there remains no efficient mechanism available to customers that empowers them to avoid this aggravation. As will be seen, the systems and methods of the present invention allows customers to efficiently state a preference as to whether they would like to chat with a human agent rather than a chatbot and then implement the routing of the interaction in accordance with that preference. Aspects of the present invention also may be used to give the customer a choice between a human agent and a chatbot, as there is the rare exception of a customer that prefers to engage, at least initially, with a chatbot. Further aspects of the present invention allow customer to switch chat preferences when informed of lengthy wait times.

Thus, the present invention includes a computer-implemented method and systems for implementing chats between customers and chat resources associated with organizational entities. As used herein, a "chat" is defined as an exchange of text inputs between a customer using a customer device and a chat resource (such as a human agent or chatbot) over a network. As shown in FIG. 7, in exemplary embodiments, the present method may include the following steps: a) providing a chat feature 282 on a webpage 280 associated with the organizational entity, such as "AAA Mortgages" (with the chat feature 282 being accessible by the customer upon the customer accessing the webpage 280 via a customer device and configured to enable the customer to instigate the chat with the chat resource); b) providing, as part of the chat feature 282, a chat interface 290 for display on the customer device as part of the webpage 280; c) providing, as part of the chat feature 282, two types of chat resources for generating the text inputs (i.e., the responses) to customer that are differentiated by whether the text inputs are generated by an automated source, in which case the type of chat resources is designated as an automated chat resource type, or generated by a human source, in which case the type of chat resources is designated as a human chat resource type; d) providing, as part of the chat feature 282, a routing function that selectively routes incoming chats between the two types of the chat resources so that, in operation of the chat feature 282, at least some of the incoming chats are routed to the chat resources of the automated chat resource type and at least some of the incoming chats are routed to the chat resources of the human chat resource type; e) providing, as part of the chat feature 282, a first selectable portion 295 that displays on the chat interface 290 that, when selected by the customer, indicates a customer chat preference as to whether the customer prefers to chat with the chat resources of the automated chat resource type or the chat resources of the human chat resource type; and f) using the chat feature 282 in an implementation routine to implement a chat instigated by a first customer of the customers.

When described in relation to a particular customer (i.e., a "first customer"), the implementation routine may include the steps of: a) transmitting a signal configured to generate the chat interface 290 on the customer device of the first customer, wherein the chat interface 290 generated on the customer device of the first customer includes the first selectable portion 295; receiving input from the customer device of the first customer indicating that the first customer selected the first selectable portion 295; b) determining, from the received input, the customer chat preference of the first customer; and c) routing the chat of the first customer to the chat resources of the human chat resource type or the chat resources of the automated chat resource type in accordance with the determined customer chat preference of the first customer.

According to exemplary embodiments, the automated chat resource type may include one or more chatbots, and the human chat resource type may include one or more human customer service agents. Further, the organizational entity may include a business as well as other types of organizations, such as a governmental agency, non-profit, educational institution, etc. In certain embodiments, the webpage 280 may include information regarding a product or service offered by the business.

As stated, one aspect of the present invention is to allow customers a way to quickly avoid chatting with automated chatbots. Thus, in exemplary embodiments, the input received from the first customer (i.e., that indicates that the first customer selected—e.g., clicked on—the first selectable portion 295) may be configured so that that simple act communicates that the first customer does not want to chat with a chatbot. Thus, this selection may be quickly construed as determine that the customer chat preference of the first customer is a preference to chat with a chat resource of the human chat resource type (i.e., a human). When this is the case, in exemplary embodiments, the first selectable portion 295 may take a form of a short phrase and/or icon that quickly communicates to the first customer that its selection will convey for the first customer a particular chat preference. For example, as shown in FIG. 7, the first selectable portion 295 may include a phrase such as "no bot". Alternatively, phrases such as "no robot" or "no chatbot" may be used. Such a phrase may be combined with an icon, as shown in FIG. 7, or provided without an icon.

In exemplary embodiments in which an icon is provided, the icon may be a pictorial representation that quickly communicates to the first customer that its selection will convey for the first customer a particular chat preference. Such a preference can pictorially be expressed in negative terms (i.e., in terms of what the customer would like to avoid), such as the customer being against chatting with an automated chat resource, or in positive terms (i.e., in terms of what the customer would like), such as the customer being in favor of chatting with a human agent. In regard to the first "negative" case, in exemplary embodiments, the first selectable portion 295 may include an icon pictorially representing a preference to avoid chatting with the chat resources of the automated chat resource type. In such cases, as shown in FIG. 7, the pictorial representation of the selectable portion 295 may include a picture of a robot with one or more cancellation lines drawn through the robot. In regard to the latter "positive" case, the first selectable portion 295 may include an icon pictorially representing a preference to chat with the chat resources of the human chat resource type. In such cases, the pictorial representation of the first selectable portion 295 may include a picture of a human customer service agent, an example of which is shown in FIG. 8.

In alternative embodiments, such as the embodiment of FIG. 8, first selectable portion 295 may be divided into two alternative selectable portions so that the customer may choose their chat preference by choosing between the two selectable portions. As depicted, the two alternative selectable portions may include a human type selectable portion 296 and automated type selectable portion 297. In such cases, when the input received from the customer device indicates selection of the human type selectable portion 296, the customer chat preference of the first customer is determined to be a preference to chat with the chat resources of the human chat resource type. And, when the input received from the customer device indicates selection of the automated type selectable portion 297, the customer chat preference of the first customer is determined to be a preference to chat with the chat resources of the automated chat resource type. In such embodiments, the human type selectable portion 296 may include an icon pictorially representing a human customer service agent. And, the automated type selectable portion 297 may include an icon pictorially representing a robot. In this case, as will be appreciated, the robot is purposefully presented without the cancellation lines.

In alternative embodiments, providing customers with the ability to choose chat preferences may be done selectively. Specifically, the choice may only be provided to preferred customers, i.e., those customers having a preferred status with the organizational entity or business related to the webpage. Such preferred status can be determined in any conventional or usual way, such as by registration, level of business the customer conducts, etc. Thus, in exemplary embodiments, as a precondition to being able to make a chat preference, a preferred customer identification routine may be performed to confirm that the first customer has a preferred customer status in relation to the organizational entity. The preferred customer identification routine may include the steps of: a) determining an identity of the first customer; b) comparing the identity of the first customer against a list of known customers having the preferred customer status in relation to the organizational entity; and c) proceeding with the implementation routine (i.e., the process by which the chat preference is submitted) once the comparison confirms that the first customer may be one of the known customers having the preferred customer status. If it is determined that the customer does not have a preferred status, the customer's chat request will be routed per normal operation.

In alternative embodiments, as shown in FIG. 9, the customer may be given the chance to change their chat preference in response to being shown how long it will take to chat with a human agent. In such exemplary embodiments, in response to the routing of the first customer's chat of the first customer to the chat resources of the human chat resource type, the implementation routine may further include: a) determining an estimated wait time 301 for connecting the chat of the first customer with one of the chat resources of the human chat resource type; b) transmitting a signal configured to generate a message 300 in the chat interface 290 that both communicates the estimated wait time 301 and provides a second selectable portion 303 (as shown an explanatory note 305 may also be provided); c) receiving input from the customer device of the first customer indicating that the first customer selected the second selectable portion 303; d) determining, from the received input, that the customer chat preference of the first customer is changed from the chat resources of the human chat resource type to the chat resources of the automated chat resource type; and e) rerouting the chat of the first customer to the chat resources of the automated chat resource. In such cases, as illustrated, the second selectable portion 303 may include an icon pictorially representing a robot.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof That which is claimed:

1. A computer-implemented method related to implementing chats between customers and chat resources associated with an organizational entity, wherein each of the chats includes an exchange of text inputs between a customer of the customers using a customer device and a chat resource of the chat resources over a network, the method comprising:

providing a chat feature on a webpage associated with the organizational entity, wherein the chat feature is accessible by the customer upon the customer accessing the webpage via the customer device and configured to enable the customer to instigate the chat with the chat resource;

providing, as part of the chat feature, a chat interface for display on the customer device as part of the webpage;

providing, as part of the chat feature, two types of the chat resources for generating the text inputs of the chats, wherein the two types of the chat resources are differentiated by whether the text inputs are generated by an automated source, in which case the type of chat resources is designated as an automated chat resource type, or generated by a human source, in which case the type of chat resources is designated as a human chat resource type;

providing, as part of the chat feature, a routing function that selectively routes incoming chats between the two types of the chat resources so that, in operation of the chat feature, at least some of the incoming chats are routed to the chat resources of the automated chat resource type and at least some of the incoming chats are routed to the chat resources of the human chat resource type;

providing, as part of the chat feature, a first selectable portion that displays on the chat interface that, when selected by the customer, indicates a customer chat preference as to whether the customer prefers to chat with the chat resources of the automated chat resource type or the chat resources of the human chat resource type; and using the chat feature in an implementation routine to implement a first chat of the chats instigated by a first customer of the customers, wherein the implementation routine includes:

transmitting a signal configured to generate the chat interface on the customer device of the first customer, wherein the chat interface generated on the customer device of the first customer comprises the first selectable portion;

receiving input from the customer device of the first customer indicating that the first customer selected the first selectable portion;

determining, from the received input, the customer chat preference of the first customer; and routing the first chat of the first customer to the chat resources of the human chat resource type or the chat resources of the automated chat resource type in accordance with the determined customer chat preference of the first customer, wherein the first selectable portion is divided into two alternative selectable portions, the two alternative selectable portions including a human type selectable portion and automated type selectable portion, wherein when the input received from the customer device indicates selection of the human type selectable portion, the customer chat preference of the first customer is determined to be a preference to chat with the chat resources of the human chat resource type, and when the input received from the customer device indicates selection of the automated type selectable portion, the customer chat preference of the first customer is determined to be a preference to chat with the chat resources of the automated chat resource type, and the human type selectable portion comprises an icon pictorially representing a human customer service agent, and the automated type selectable portion comprises an icon pictorially representing a robot.

2. The method according to claim 1, wherein the chat interface further comprises a customer input portion that displays text associated with a current text input by the customer and a conversation portion for displaying text associated with one or more previous text inputs by the customer or the chat resource; and wherein:
the automated chat resource type comprises one or more chatbots; and
the human chat resource type comprises one or more human customer service agents.

3. The method according to claim 1, wherein the organizational entity comprises a business, and the webpage includes information regarding a product or service offered by the business;
wherein, as a precondition to operation of the implementation routine, a preferred customer identification routine is performed to confirm that the first customer comprises a preferred customer status in relation to the organizational entity, the preferred customer identification routine comprising:
determining an identity of the first customer;
comparing the identity of the first customer against a list of known customers having the preferred customer status in relation to the organizational entity; and
proceeding with the implementation routine once the comparison confirms that the first customer is one of the known customers having the preferred customer status.

4. The method according to claim 1, wherein the input received indicating that the first customer selected the first selectable portion determines that the customer chat preference of the first customer is a preference to chat with the chat resources of the human chat resource type.

5. The method according to claim 4, wherein the first selectable portion comprises a phrase, the phrase comprising at least one of: "no bot"; "no robot"; and "no chatbot".

6. The method according to claim 4, wherein the first selectable portion comprises an icon pictorially representing a preference to chat with the chat resources of the human chat resource type.

7. The method according to claim 6, wherein the pictorial representation comprises a picture of a human customer service agent.

8. The method according to claim 4, wherein the first selectable portion comprises an icon pictorially representing a preference to avoid chatting with the chat resources of the automated chat resource type.

9. The method according to claim 8, wherein the pictorial representation comprises a picture of a robot with one or more cancellation lines drawn through the robot.

10. The method according to claim 8, wherein the organizational entity comprises a business, and the webpage includes information regarding a product or service offered by the business;
wherein, as a precondition to operation of the implementation routine, a preferred customer identification routine is performed to confirm that the first customer comprises a preferred customer status in relation to the organizational entity, the preferred customer identification routine comprising:
determining an identity of the first customer;
comparing the identity of the first customer against a list of known customers having the preferred customer status in relation to the organizational entity; and
proceeding with the implementation routine once the comparison confirms that the first customer is one of the known customers having the preferred customer status.

11. The method according to claim 4, wherein, in response to the routing the first chat of the first customer to the chat resources of the human chat resource type, the implementation routing further comprises:
determining an estimated wait time for connecting the first chat of the first customer with one of the chat resources of the human chat resource type;
transmitting a signal configured to generate a message in the chat interface that:
communicates the estimated wait time;
provides a second selectable portion;
receiving input from the customer device of the first customer indicating that the first customer selected the second selectable portion;
determining, from the received input, that the customer chat preference of the first customer is changed from the chat resources of the human chat resource type to the chat resources of the automated chat resource type; and
rerouting the first chat of the first customer to the chat resources of the automated chat resource.

12. The method according to claim 11, wherein the second selectable portion comprises an icon pictorially representing a robot.

13. A system for implementing chats between customers and chat resources associated with an organizational entity, wherein each of the chats includes an exchange of text inputs between a customer of the customers using a customer device and a chat resource of the chat resources over a network, the system comprising:
a hardware processor; and
a machine-readable storage medium on which is stored instructions that cause the hardware processor to execute a process, wherein the process comprises:
providing a chat feature on a webpage associated with the organizational entity, wherein the chat feature is accessible by the customer upon the customer accessing the webpage via the customer device and configured to enable the customer to instigate the chat with the chat resource;

providing, as part of the chat feature, a chat interface for display on the customer device as part of the webpage;

providing, as part of the chat feature, two types of the chat resources for generating the text inputs of the chats, wherein the two types of the chat resources are differentiated by whether the text inputs are generated by an automated source, in which case the type of chat resources is designated as an automated chat resource type, or generated by a human source, in which case the type of chat resources is designated as a human chat resource type;

providing, as part of the chat feature, a routing function that selectively routes incoming chats between the two types of the chat resources so that, in operation of the chat feature, at least some of the incoming chats are routed to the chat resources of the automated chat resource type and at least some of the incoming chats are routed to the chat resources of the human chat resource type;

providing, as part of the chat feature, a first selectable portion that displays on the chat interface that, when selected by the customer, indicates a customer chat preference as to whether the customer prefers to chat with the chat resources of the automated chat resource type or the chat resources of the human chat resource type; and using the chat feature in an implementation routine to implement a first chat of the chats instigated by a first customer of the customers, wherein the implementation routine includes:

transmitting a signal configured to generate the chat interface on the customer device of the first customer, wherein the chat interface generated on the customer device of the first customer comprises the first selectable portion;

receiving input from the customer device of the first customer indicating that the first customer selected the first selectable portion;

determining, from the received input, the customer chat preference of the first customer; and routing the first chat of the first customer to the chat resources of the human chat resource type or the chat resources of the automated chat resource type in accordance with the determined customer chat preference of the first customer, wherein the first selectable portion is divided into two alternative selectable portions, the two alternative selectable portions including a human type selectable portion and automated type selectable portion, wherein when the input received from the customer device indicates selection of the human type selectable portion, the customer chat preference of the first customer is determined to be a preference to chat with the chat resources of the human chat resource type, and when the input received from the customer device indicates selection of the automated type selectable portion, the customer chat preference of the first customer is determined to be a preference to chat with the chat resources of the automated chat resource type, and the human type selectable portion comprises an icon pictorially representing a human customer service agent, and the automated type selectable portion comprises an icon pictorially representing a robot.

14. The system according to claim 13, wherein the organizational entity comprises a business, and the webpage includes information regarding a product or service offered by the business;

wherein the instructions further cause the hardware processor to execute, as a precondition to operation of the implementation routine, a preferred customer identification routine, the preferred customer identification routine being performed to confirm that the first customer comprises a preferred customer status in relation to the organizational entity, wherein the preferred customer identification routine comprises:

determining an identity of the first customer;

comparing the identity of the first customer against a list of known customers having the preferred customer status in relation to the organizational entity; and proceeding with the implementation routine once the comparison confirms that the first customer is one of the known customers having the preferred customer status.

15. The system according to claim 13, wherein the first selectable portion comprises a phrase, the phrase comprising at least one of: "no bot"; "no robot"; and "no chatbot".

16. The system according to claim 13, wherein the first selectable portion comprises an icon pictorially representing a preference to avoid chatting with the chat resources of the automated chat resource type, wherein the pictorial representation comprises a picture of a robot with one or more cancellation lines drawn through the robot.

* * * * *